US012651202B1

(12) United States Patent
Nettle et al.

(10) Patent No.: US 12,651,202 B1
(45) Date of Patent: Jun. 9, 2026

(54) CUSTOMIZED TRAINING OF FOUNDATION MODELS

(71) Applicant: AVTAR Inc., Richardson, TX (US)

(72) Inventors: Paul Nettle, Plano, TX (US); Francis Hoang, Richardson, TX (US); Bejoy Devasia, Richardson, TX (US)

(73) Assignee: AVTAR Inc., Richardson, TX (US)

( * ) Notice: Subject to any disclaimer, the term of this patent is extended or adjusted under 35 U.S.C. 154(b) by 0 days.

(21) Appl. No.: 19/196,866

(22) Filed: May 2, 2025

Related U.S. Application Data

(63) Continuation of application No. 19/097,198, filed on Apr. 1, 2025.

(51) Int. Cl.
*G06N 20/00* (2019.01)
(52) U.S. Cl.
CPC .................................. *G06N 20/00* (2019.01)
(58) Field of Classification Search
CPC .......... G06N 20/00; G06N 5/02; G06N 5/022; G06F 16/3344
See application file for complete search history.

(56) References Cited

U.S. PATENT DOCUMENTS

2020/0327454 A1* 10/2020 Chuang ................... G06N 20/10
2022/0063658 A1* 3/2022 Yokoyama ............. G07C 5/008

2023/0032822 A1* 2/2023 Wang ..................... G06N 20/20
2025/0103910 A1* 3/2025 Turley ................... G06N 20/00
2025/0139387 A1* 5/2025 Jang ....................... G06F 40/284
2025/0156684 A1* 5/2025 Liu ....................... G06N 3/0455
2025/0181910 A1* 6/2025 Yuan ........................ G06N 3/08

FOREIGN PATENT DOCUMENTS

WO WO-2023091436 A1 * 5/2023 ........... G06F 40/295

OTHER PUBLICATIONS

Houlsby et al., "Parameter-Efficient Transfer Learning for NLP," CoRR, Submitted Jun. 13, 2019, arXiv:1902.00751v2, 13 pages.
(Continued)

*Primary Examiner* — Tewodros E Mengistu
(74) *Attorney, Agent, or Firm* — Fish & Richardson P.C.

(57) ABSTRACT

The present disclosure involves methods, apparatus, and systems for customizing artificial intelligence (AI) models by performing automated, on-demand training. This can include, receiving, from an entity, a prompt for a generative AI model; updating a first interaction record with the prompt, the first interaction record comprising a history of interactions between the entity and the generative AI model; in response to determining that the updated first interaction record is greater than a predetermined size: loading the generative AI model into a training environment; loading one or more adapters in the training environment; training the one or more adapters in the training environment with the generative AI model based on the first interaction record; updating a second interaction record with the history of interactions in the first interaction record; clearing the first interaction record; and loading the trained one or more adapters with the generative AI model in an inference environment.

18 Claims, 4 Drawing Sheets

(56)           References Cited

OTHER PUBLICATIONS

Hu et al., "LLM-Adapters: An Adapter Family for Parameter-Efficient Fine-Tuning of Large Language Models," CoRR, Submitted Oct. 9, 2023, arXiv:2304.01933v3, 21 pages.

Lialin et al., "Scaling Down to Scale Up: A Guide to the Parameter-Efficient Fine-Tuning," CoRR, Submitted Nov. 22, 2024, arXiv:2303.15647v2, 57 pages.

International Search Report and Written Opinion in International Appln. No. PCT/US2025/029608, mailed on Nov. 4, 2025, 17 pages.

Tan et al., "Democratizing Large Language Models via Personalized Parameter-Efficient Fine-tuning," CoRR, Submitted Oct. 24, 2024, arXiv:2402.04401v2, 16 pages.

Tan et al., "Personalized Pieces: Efficient Personalized Large Language Models Through Collaborative Efforts," CoRR, Submitted Jun. 15, 2024, arXiv:2406.10471v1, 17 pages.

Zhuang et al., "HYDRA: Model Factorization Framework for Black-Box LLM Personalization," Paper, Presented at 38th Conference on Neural Information Processing Systems (NeurIPS 2024), Vancouver, Canada, Dec. 9-15, 2024, 33 pages.

* cited by examiner

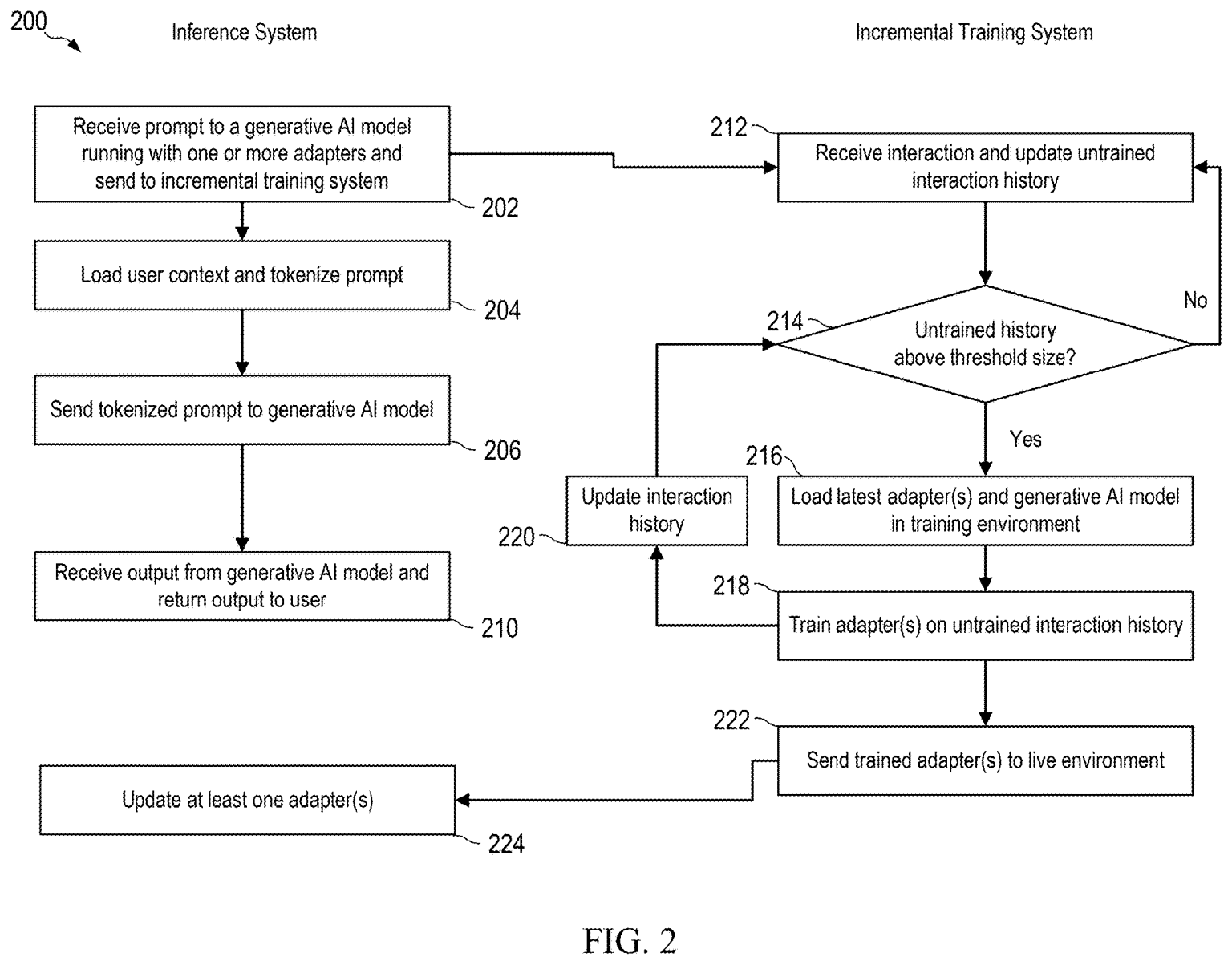

200

Inference System

202 — Receive prompt to a generative AI model running with one or more adapters and send to incremental training system 204 — Load user context and tokenize prompt 206 — Send tokenized prompt to generative AI model 210 — Receive output from generative AI model and return output to user 224 — Update at least one adapter(s)

Incremental Training System

212 — Receive interaction and update untrained interaction history

214 — Untrained history above threshold size?

No

Yes

216 — Load latest adapter(s) and generative AI model in training environment

218 — Train adapter(s) on untrained interaction history

222 — Send trained adapter(s) to live environment

220 — Update interaction history

FIG. 2

CUSTOMIZED TRAINING OF FOUNDATION MODELS

CROSS REFERENCE TO RELATED APPLICATIONS

This application is a continuation of U.S. application Ser. No. 19/097,198, filed Apr. 1, 2025, the entire contents of which are incorporated herein by reference.

TECHNICAL FIELD

The present disclosure generally relates to customizing artificial intelligence (AI) models by performing automated, on-demand training.

BACKGROUND

Large, multi-purpose AI models that are trained on huge data sets are adaptable to a wide range of downstream tasks are sometimes referred to as foundational models. Large language models (LLMs), image generation models, and others are examples of foundational AI models that can act as virtual assistants, search engines, code generators, and chatbots, as well as other suitable functions. In some instances, these foundational models can be generative AI models which can create new content or new data in response to a prompt, instead of merely analyzing or classifying existing data.

SUMMARY

The present disclosure relates to a method, system, and computer-readable storage media for customizing artificial intelligence (AI) models by performing automated, on-demand training. This can include, receiving, from an entity, a prompt for a generative AI model; updating a first interaction record with the prompt, the first interaction record comprising a history of interactions between the entity and the generative AI model; and in response to determining that the updated first interaction record is greater than a predetermined size: loading the generative AI model into a training environment; loading one or more adapters in the training environment; training the one or more adapters in the training environment with the generative AI model based on the first interaction record; updating a second interaction record with the history of interactions in the first interaction record; clearing the first interaction record; and loading the trained one or more adapters with the generative AI model in an inference environment.

Implementations can optionally include one or more of the following features.

In some instances, the prompt is tokenized after being received from the entity and after the first interaction record is updated.

In some instances, determining that the updated first interaction record is greater than the predetermined size is based on a number of tokens in the first interaction record.

In some instances, the trained adapter is stored as an encrypted package in an adapter repository.

In some instances, training the one or more adapters in the training environment comprises: performing parameter efficient fine tuning (PEFT) on the generative AI model with the adapter.

In some instances, the one or more adapters comprise a feedforward neural network with a bottleneck architecture.

In some instances, the second interaction record comprises interaction history between the entity and the generative AI model that has been previously used to train the one or more adapters.

In some instances, the entity is a human user.

In some instances, the generative AI model is a first generative AI model, and the entity is a second generative AI model.

According to a second aspect, one or more computer-readable storage media is provided. The one or more computer-readable storage media stores one or more instructions that, when executable by one or more computers, cause the one or more computers to perform the method according to the first aspect or one or more implementations of the first aspect.

According to a third aspect, a computer-implemented system is provided. The computer-implemented system includes one or more computers and one or more computer memory devices interoperably coupled with the one or more computers. The one or more computer memory devices have computer-readable storage media storing one or more instructions that, when executed by the one or more computers, perform the method according to the first aspect or one or more implementations of the first aspect.

While generally described as computer-implemented software embodied on tangible media that processes and transforms the respective data, some or all of the aspects can be computer-implemented methods or further included in respective systems or other devices for performing this described functionality. The details of these and other aspects and implementations of the present disclosure are set forth in the accompanying drawings and the description below. Other features, objects, and advantages of the disclosure will be apparent from the description and drawings, and from the claims.

BRIEF DESCRIPTION OF DRAWINGS

FIG. 2 is a flowchart illustrating an example process for using and incrementally customizing a generative AI model.

Like reference numbers and designations in the various drawings indicate like elements.

DETAILED DESCRIPTION

Figure 1:
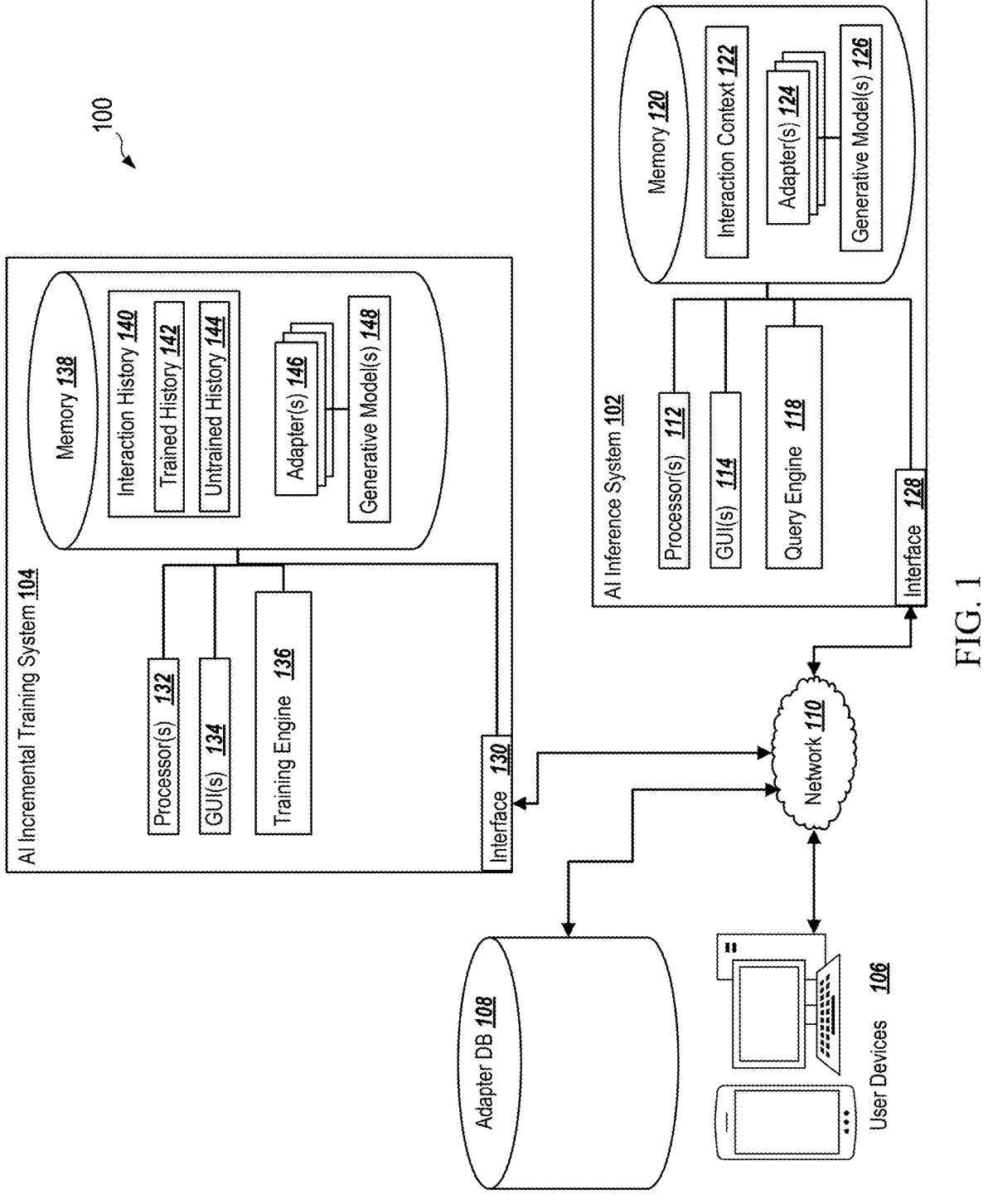
FIG. 1 illustrates a block diagram of an example system for incremental customization of a generative AI model.

This specification relates to customizing generative AI models in an incremental and relatively low-compute-cost manner such that the generative AI model can learn a deeper, more individualized context on a per-user basis. Large language models (LLMs), image generators, and other foundational models are often trained on very large datasets, with numerous training techniques, such as deep learning, self-supervised learning, and/or transfer learning. Training these models often requires significant computational resources, including specialized hardware such as tensor processing units, or large clusters of graphics processing units. Because of the relative cost for training these large models, individual user-customized models can be difficult to achieve. However, user-customized AI models can outperform their generic AI model counterparts, providing more accurate responses to their associated users, and an overall enhanced user experience.

Iterative training can be accomplished using adapter networks, which are a form of parameter-efficient fine-tuning (PEFT) for larger models, such as foundation models (e.g., LLMs). Adapters enable relatively low-cost and fast training to enhance the performance of the larger model. By recording a user's interaction history with a generative AI model and incrementally training and updating the associated adapter, the resulting AI model with adapter can "remember" a user's entire interaction history—not merely the context stored in the most recent set of tokens. This enables highly customized, individualized AI models that can be used in a broad range of applications.

Incrementally training and customizing an AI model can be advantageous in that it can provide better results that are closer to what the user prompted due to the model's deeper understanding of the individual user and their needs or requests. In some implementations, once enough context is stored and trained, the generative AI model can begin to imitate or accurately replicate the actions of the user. In those instances, the AI model can be used as an agent for the user, making decisions and taking actions on behalf of the user based on the user's preferences.

Another advantage is that these trained customized AIs can represent a digital imprint of their user. They can be used to facilitate interactions with other people and systems. For example, a user could ask the digital imprint of their friend which gift they would prefer for their birthday. The digital imprint could accurately respond based on its specific knowledge of the friend, enabling the user to buy the perfect gift without spoiling the surprise.

In some implementations, adapters can be aggregated to create combinations of human imprints. For example, each of the Supreme Court Justices including retired Justices' adapters could be combined to make a hybrid Supreme Court Justice that could interpret constitutional law based on a combined knowledge of several lifetimes sitting on the Judiciary.

In some implementations, adapters can be trained to mimic or update user voice, facial expressions, mannerisms, or other features. That is, the described solution is not limited to text interactions, but can include audio, video, neural or other interfaces. In some implementations, a generative AI model can include multiple adapters. For example, an adapter can be used to mimic the user's voice, or voice preferences, and a separate adapter can be used to adjust the semantics of the response. A third adapter might be used to generate visual representations of a model output, such as a lip-synced rendering of a human face, or an image or video representing the output.

Turning to the figures, FIG. 1 illustrates a block diagram of an example system 100 for incremental customization of a generative AI model. The system 100 includes an AI inference system 102. The system 100 further includes one or more user devices 106, an AI incremental training system 104, and an adapter database 108.

The AI inference system 102 can receive prompts, run those prompts through one or more AI models 126, and return a response to the prompt. It includes one or more processors 112, a GUI 114, a query engine 118, a memory 120, and an interface 128.

Interface 128 is used by the AI inference system 102 to communicate with other systems in a distributed environment—including within the system 100—connected to the network 110 (e.g., user devices 106, AI incremental training system 104, and other systems communicably coupled to the illustrated AI inference system 102 and/or network 110). Generally, the interface 128 includes logic encoded in software and/or hardware in a suitable combination and operable to communicate with the network 110 and other components. More specifically, the interface 128 can include software supporting one or more communication protocols associated with communications such that the network 110 and/or interface's 128 hardware is operable to communicate physical signals within and outside of the illustrated system 100. Still further, the interface 128 can allow the AI inference system 102 to communicate with the user devices 106, and/or other portions illustrated within the system 100 to perform the operations described herein.

Each of the one or more processors 112 can be a central processing unit (CPU), an application specific integrated circuit (ASIC), a field-programmable gate array (FPGA), or another suitable component. Generally, the processor 112 executes instructions and manipulates data to perform the operations of the AI inference system 102. Specifically, the processor 112 executes the algorithms and operations described in the illustrated figures, as well as the various software modules and functionality, including the functionality for sending communications to and receiving transmissions from the user devices 106, as well as to other devices and systems. Each processor 112 can have a single or multiple cores, with each core available to host and execute an individual processing thread. Further, the number of, types of, and particular processors 112 used to execute the operations described herein can be dynamically determined based on a number of requests, interactions, and operations associated with the AI inference system 102.

Regardless of the particular implementation, "software" includes computer-readable instructions, firmware, wired and/or programmed hardware, or any combination thereof on a tangible medium (transitory or non-transitory, as appropriate) operable when executed to perform at least the processes and operations described herein. In fact, each software component can be fully or partially written or described in any appropriate computer language including Python, C, C++, JavaScript, Java™, Visual Basic, assembler, Perl®, any suitable version of fourth-generation programming language (4GL), as well as others.

GUI 114 of the AI inference system 102 interfaces with at least a portion of the system 100 for any suitable purpose, including generating a visual representation of any particular application or results and/or the content associated with any components of the user devices 106. In particular, the GUI 114 can be used to present results of a query or prompt, or allow a developer to input queries or prompts to the AI inference system 102, as well as to otherwise interact and present information associated with one or more applications. GUI 114 can also be used to view and interact with various web pages, applications, and web services located local or external to the AI inference system 102. Generally, the GUI 114 provides the user with an efficient and user-friendly presentation of data provided by or communicated within the system. The GUI 114 can include a plurality of customizable frames or views having interactive fields, pull-down lists, and buttons operated by the user. In general, the GUI 114 is often configurable, supports a combination of tables and graphs (e.g., bar, line, pie, and/or status dials), and is able to build real time portals, application windows, and presentations. Therefore, the GUI 114 contemplates any suitable GUI, such as a combination of a generic web browser, a web-enabled application, intelligent engine, and command line interface (CLI) that processes information in the platform and efficiently presents the results to the user visually.

The query engine 118 can receive prompts from the user devices 106 and use one or more generative AI models 126 with one or more adapters 124 to return a result. In some implementations, the query engine 118 can be accessed by a user device 106, via one or more graphical user interfaces 114. In general, the query engine 118 receives a prompt from a user device 106 and tokenizes it, or otherwise encodes it for consumption by the generative AI models 126. This prompt can then be combined with tokens from previous prompts and their associated responses stored in an interaction context 122. In some implementations the interaction context 122 stores a limited interaction history, and the query engine 118 combines that interaction history with the current prompt to provide a prompt that is at or near the maximum token limit accepted by the generative models 126.

The generative models 126 can be, for example, foundational models, and are generally configured to generate an output in response to an input prompt. The generative models 126 can include one or more neural networks. A "neural network" can be a deep learning-based machine learning network. The neural network processes inputs and provides respective outputs, which typically include an input layer and an output layer and one or more hidden layers between the input layer and the output layer. Neural networks used in deep learning applications can often include many hidden layers, increasing the depth of the network. Each layer of the neural network can be connected in sequence such that the output of the previous layer is provided as an input to the next layer, where the input layer receives the input of the neural network, and the output of the output layer serves as the final output of the neural network. Each layer of the neural network includes one or more nodes (also referred to as processing nodes or neurons), each node processing input from the previous layer. The generative models 126 can be deployed within the AI inference system 102 or may be deployed on other devices. The generative models 126 can be based on any suitable model structure including, but not limited to, a Transformer model, a convolutional neural network (CNN), a recurrent neural network (RNN), a deep neural network (DNN), or the like. In some implementations, the generative models 126 may be based on a large language model (LLM). In some implementations, the generative models 126 are commercially available LLMs or other specifically designed or trained generative AI models.

Generative models 126 can include a combination of machine learning algorithms, neural network, and/or large language models. A LLM is a model that is trained to generate and understand human language. LLMs are trained on massive datasets of text and code, and they can be used for a variety of tasks. For example, LLMs can be trained to translate text from one language to another; summarize text, such as web site content, search results, news articles, or research papers; answer questions about text, such as "What is the capital of Georgia?"; create chatbots that can have conversations with humans; and generate creative text, such as poems, stories, and code. For brevity, large language models are also referred to herein as "language models."

The language model can be any appropriate language model neural network that receives an input sequence made up of text tokens selected from a vocabulary and auto-regressively generates an output sequence made up of text tokens from the vocabulary. For example, the language model can be a Transformer-based language model neural network or a recurrent neural network-based language model.

In some situations, the language model can be referred to as an auto-regressive neural network when the neural network used to implement the language model auto-regressively generates an output sequence of tokens. More specifically, the auto-regressively generated output is created by generating each particular token in the output sequence conditioned on a current input sequence that includes any tokens that precede the particular text token in the output sequence, i.e., the tokens that have already been generated for any previous positions in the output sequence that precede the particular position of the particular token, and a context input that provides context for the output sequence.

For example, the current input sequence when generating a token at any given position in the output sequence can include the input sequence and the tokens at any preceding positions that precede the given position in the output sequence. As a particular example, the current input sequence can include the input sequence followed by the tokens at any preceding positions that precede the given position in the output sequence. Optionally, the input and the current output sequence can be separated by one or more predetermined tokens within the current input sequence.

More specifically, to generate a particular token at a particular position within an output sequence, the neural network of the language model can process the current input sequence to generate a score distribution (e.g., a probability distribution) that assigns a respective score, e.g., a respective probability, to each token in the vocabulary of tokens. The neural network of the language model can then select, as the particular token, a token from the vocabulary using the score distribution. For example, the neural network of the language model can greedily select the highest-scoring token or can sample, e.g., using nucleus sampling or another sampling technique, a token from the distribution.

As a particular example, the language model can be an auto-regressive Transformer-based neural network that includes (i) a plurality of attention blocks that each apply a self-attention operation and (ii) an output subnetwork that processes an output of the last attention block to generate the score distribution.

Generally, however, the Transformer-based neural network includes a sequence of attention blocks, and, during the processing of a given input sequence, each attention block in the sequence receives a respective input hidden state for each input token in the given input sequence. The attention block then updates each of the hidden states at least in part by applying self-attention to generate a respective output hidden state for each of the input tokens. The input hidden states for the first attention block are embeddings of the input tokens in the input sequence and the input hidden states for each subsequent attention block are the output hidden states generated by the preceding attention block.

Enhancing the generative models 126, and improving their performance are one or more adapters 124. Adapters 124 are an implementation of PEFT and involve integrating an additional feed forward network layer in between layers of the generative AI models 126. The adapters 124 map the pre-trained generative models' 126 hidden state representation to a specialized representation needed for a new task or improved performance. In some implementations, the adapter and original model are trained together on new training data, allowing the adapter to learn the new mapping while the original model weights remain unchanged. This approach preserves the knowledge in the original pre-trained weights, saving significant retraining resources. Multiple different adapters 124 can also be added to the same foundation model for multi-task learning. The adapters 124 provide targeted task-specific customization of the model without interfering with each other.

In some implementations, adapters 124 include a bottleneck architecture. They can be placed within each transformer layer (or other portion of the neural network) of the generative models 126, and project an original dimensional input into a smaller dimension. By providing a bottleneck, fewer parameters need to be trained allowing for more efficient training. Additionally, the bottleneck amount of the adapter 124 can be tuned to tradeoff between performance and parameter efficiency. In some implementations, the bottleneck amount (or size of the smaller dimension compared to the original dimension) is in the range of 0.25% to 10%.

In some implementations, the adapters 124 are trained on context or interaction history beyond the typical token limit of the generative AI models 126. For example, the adapter 124 can be periodically trained on the past interaction history when a token limit is reached. In this manner, the overall model (adapters 124 and generative models 126) can retain long-term complex context. Additionally, because adapters 124 are relatively low cost to train, this can be performed on a per-user basis.

In some implementations, each user or user device 106 can be associated with one or more adapters 124 that represent a user customization of the generative models 126. For example, in some implementations each user can have a "private" adapter, and a "public" adapter. The private adapter can be used only when prompts are received from that user and can allow a user to share secret or personal information with the generative models 126 in a secure manner. A "public" adapter can include customizations based on interactions or prompts that are marked public by the user, and can represent a shareable customization that can, for example, enable other users to interact with a particular user's customized model.

In FIG. 1, the interaction context 122 is stored in the same memory 120 as the adapters 124 and the generative models 126. In some implementations, different memories, or cloud memories are used. That is, memory 120 is not necessarily a singular memory, nor is it necessarily contained within AI inference system 102.

Memory 120 of the AI inference system 102 can represent a single memory or multiple memories. The memory 120 can include any memory or database module and can take the form of volatile or non-volatile memory including, without limitation, magnetic media, optical media, random access memory (RAM), read-only memory (ROM), removable media, or any other suitable local or remote memory component. The memory 120 can store various objects or data, including digital asset data, public keys, user and/or account information, administrative settings, password information, caches, applications, backup data, repositories storing business and/or dynamic information, and any other appropriate information associated with the AI inference system 102, including any parameters, variables, algorithms, instructions, rules, constraints, or references thereto. Additionally, the memory 120 can store any other appropriate data, such as VPN applications, application programming interfaces (APIs), firmware logs and policies, firewall policies, a security or access log, print or other reporting files, as well as others. While illustrated within the AI inference system 102, memory 120 or any portion thereof, including some or all of the particular illustrated components, can be located remote from the AI inference system 102 in some instances, including as a cloud application or repository or as a separate cloud application or repository when the AI inference system 102 itself is a cloud-based system. In some instances, some or all of memory 120 can be located in, associated with, or available through one or more other systems of the associated enterprise software platform. In those examples, the data stored in memory 120 can be accessible, for example, via one of the described applications or systems. As illustrated and previously described, memory 120 includes an interaction context 122, and one or more generative models 126 each operating with one or more adapters 124.

Network 110 facilitates wireless or wireline communications between the components of the system 100 (e.g., between the AI inference system 102, and the user devices 106), as well as with any other local or remote computers, such as additional mobile devices, clients, servers, or other devices communicably coupled to network 110, including those not illustrated in FIG. 1. In the illustrated environment, the network 110 is depicted as a single network, but can comprise more than one network without departing from the scope of this disclosure, so long as at least a portion of the network 110 can facilitate communications between senders and recipients. In some instances, one or more of the illustrated components (e.g., the AI inference system 102 or the adapter database 108) can be included within or deployed to network 110 or a portion thereof as one or more cloud-based services or operations. The network 110 can be all or a portion of an enterprise or secured network, while in another instance, at least a portion of the network 110 can represent a connection to the Internet. In some instances, a portion of the network 110 can be a virtual private network (VPN). Further, all or a portion of the network 110 can comprise either a wireline or wireless link. Example wireless links can include 802.11a/b/g/n/ac, 802.20, WiMax, LTE, and/or any other appropriate wireless link. In other words, the network 110 encompasses any internal or external network, networks, sub-network, or combination thereof operable to facilitate communications between various computing components inside and outside the illustrated system 100. The network 110 can communicate, for example, Internet Protocol (IP) packets, Frame Relay frames, Asynchronous Transfer Mode (ATM) cells, voice, video, data, and other suitable information between network addresses. The network 110 can also include one or more local area networks (LANs), radio access networks (RANs), metropolitan area networks (MANs), wide area networks (WANs), all or a portion of the Internet, and/or any other communication system or systems at one or more locations.

User devices 106 can be computing devices or computers used by one or more users and developers of the software and hardware within system 100. For example, the user devices 160 can interact with the AI inference system 102 to interact with or prompt the generative models 126. As used in the present disclosure, the term "computer" or "computing devices" is intended to encompass any suitable processing device. For example, the user devices 106 can be any computer or processing device such as, for example, a blade server, general-purpose personal computer (PC), Mac®, workstation, UNIX-based workstation, or any other suitable device. In other words, the present disclosure contemplates computers other than general-purpose computers, as well as computers without conventional operating systems. The user devices 106, in some instances, can be desktop systems, a client terminal, or any other suitable device, including a mobile device, such as a smartphone, tablet, smartwatch, or any other mobile computing device. In general, each illustrated component can be adapted to execute any suitable operating system, including Linux, UNIX, Windows, Mac OS®, Java™, Android™, Windows Phone OS, or iOS™, among others. The user devices 106 can include one or more specific applications executing on the user devices 106, or the user devices 106 can include one or more Web browsers or web applications that can interact with particular applications executing remotely from the user devices 106.

AI incremental training system 104 trains or updates adapters 124 for use with the AI inference system 102. The AI incremental training system 104 includes one or more processors 132 which can be similar to the processors 112 described above. AI incremental training system 104 also includes a GUI 134, which can be used by developers or user devices 106 to interact with the AI incremental training system 104. A training engine 136 is used to record prompts and incrementally train adapters. The AI incremental training system 104 can include a memory 138, which can be different from, or the same as memory 120 described above.

The training engine 136 can receive prompts from the AI inference system 102, for example, with each new prompt, or periodically (e.g., once every hour, every ten minutes, etc.). In some implementations, the training engine 136 can crawl or extract prompts from the interaction context 122. In general, newly received prompts are stored in an interaction history 140 as untrained history 144. The interaction history 140 can store both prompts and model responses, as well as follow up prompts or other feedback provided by the user. Untrained history 144 can be interaction history that has not yet been used to train adapters. Trained history 142 can be interaction history that was previously used to train adapters. In some implementations, the trained history 142 and the untrained history 144 are stored in a secure computing environment and encrypted to prevent unauthorized access or privacy leakage.

The training engine 136 can identify a trigger event, such as the untrained history 144 reaching a specific size or being greater than a number of tokens and trigger adapter retraining. For example, if a generative model 126 can intake 12,000 tokens, the training engine 136 can trigger retraining when the untrained history 144 exceeds 10,000 tokens. When training is triggered, the training engine 136 can load the latest set of adapters 146 and the latest generative model(s) 148 into a training environment in memory 138. These adapters 146 and the generative model 148 can be loaded, for example, from a remote database, such as adapter database 108. In some implementations, the latest versions are requested and copied directly from the AI inference system 102.

Once loaded, the adapters 146 and generative models 148 can be trained on the untrained interaction history 144. This training can involve normal machine learning training techniques such as supervised or unsupervised training, reinforcement learning, and other methods. The training can be a form of PEFT and involve the use of one or more low-rank adaptation models (LoRAs) or other techniques. In some implementations, the training only occurs on the untrained data 144, which minimizes the training cost and time. In some implementations, the training occurs on the untrained history 144 and a portion of the trained history 142. The training data used can be weighted based on relative age, such that older training data is given less effect than newer training data. In some implementations, training is performed periodically on a per user basis. Additionally, while many adapters 146 may be specific to a user. One or more adapters can be trained on multiple users, or groups of users.

For example, a "scientist" adapter can be created using the interaction history 140 from a group of known scientists. Alternatively, a "musician" adapter can be trained on interactions from musicians.

In general, the adapters 146 can be trained using a combination of PEFT and LoRAs, and the untrained interaction history 144 can include conversation history, voice data, appearance data or images of the user, video of the user, speaking parameters such as voice cadence, intonation, etc. and other elements. In some implementations, a separate adapter 146 is trained for each input type. For example, one adapter can be trained on conversation semantics, while a separate adapter is trained on speech mannerisms, and a third separate adapter can be trained on facial expressions and/or body language.

Once the adapters 146 are trained, they can be uploaded to the adapter database 108, or directly to the AI inference system 102, which can replace its now outdated adapter versions with the latest adapters. In some implementations, the latest adapters and prior adapters are operated in parallel for a trial period, or until additional new adapters are updated.

AI Incremental training system 104 can communicate within the system 100 using interface 130, which can be similar to, or different from interface 128 as described above.

The adapter database 108 can be a repository of trained or customized adapters for use with various generative AI models. In some implementations, each adapter stored there can be encrypted using asymmetric encryption to ensure the security of the adapter. Each adapter, for example, can be owned (e.g., secured with the private key of) the respective user associated with that adapter. This ensures user privacy and prevents illicit access to individual user data.

FIG. 2 is a flowchart illustrating an example process 200 for using and incrementally customizing a generative AI model. The example process 200 can be performed, for instance, by system 100 as described above with respect to FIG. 1. The operations shown in process 200 may not be exhaustive and other operations can be performed before, after, or in between any of the illustrated operations. Further, some of the operations may be performed simultaneously, or in a different order than shown in FIG. 2. In some implementations, some of the operations may be performed by a computer, or multiple computers. Process 200 will be described as being performed by a system of one or more computers, located in one or more locations, and programmed appropriately in accordance with this specification. For example, one or more of a computation system 400 of FIG. 4, appropriately programmed, can perform the process 200.

At 202, an inference system can receive a prompt to a generative AI model running with one or more adapters. The prompt can be a text, audio, image(s), video, or a combination thereof, and can be delivered by a user device interacting with the inference system. The prompt can be received from a user, or other entity such as a separate generative AI model, or a model acting as an agent on behalf of a user. In other words, process 200 can occur in response to user input, causing the AI model to be incrementally trained based on a user, or instead process 200 can occur as a result of an input from an artificial source such as another AI model, or an external triggering event.

At 204, the inference system can load a user context associated with the user (or entity submitting the prompt) and tokenize the prompt. In some implementations, instead of tokenizing the prompt, the prompt is pre-processed in a different way. For example, an image input can be compressed, masked, or downscaled according to the requirements of the model it is to be provided to. In some implementations, the user context is stored locally on a user device. In some implementations, the user context is stored with an AI model to run the inference. In some instances, where a new user is interacting with the system, a new user context is generated. Tokenization can include, for example, word tokenization, character tokenization, sub-word tokenization, or a combination thereof. In some implementations, the prompt and user context are tokenized into a vector embedding. In general, the tokenized prompt and user context are formatted to a machine-readable state that is suitable for downstream machine learning processing. In addition to tokenizing the prompt (e.g., the raw, untokenized prompt) can be sent to a stored interaction repository where it can be used for training.

At 206, the tokenized prompt is sent to a generative AI model. In some implementations, the stored interaction repository is local to the inference system, and accessible, for example, by API query or other methods. In some instances, the stored interaction repository is stored at an incremental training system.

At 210, a response is received from the generative AI model at the inference system, and is sent back to the user. From the user's perspective, a routine back-and-forth (e.g., a two-way conversation) between the user and the generative AI model has occurred. In some implementations, the output can be preprocessed or formatted by the inference system before being sent back to the user.

At 212, the prompt is received from the interaction repository and an untrained interaction history is updated. The untrained interaction history can include past prompts and AI outputs that have not yet been used to train the customized AI model.

At 214, a determination is made as to whether the untrained history is greater than a threshold size. The threshold size can be, for example, a predetermined number of tokens (e.g., 4000, 8000, etc.), or for audio or video prompts, longer than a certain length of time (e.g., number of frames, number of recorded seconds etc.). In some implementations, the threshold size is based on a file size or amount of storage space required. In some implementations, the threshold size is based on the maximum input size to the generative AI model. If the threshold size is not met, no further action need be taken and process 200 can return to 212 where it will await additional interactions.

If the threshold size is exceeded, method 200 continues at 216, where a training event can be triggered and the latest adapters and the generative AI model are loaded into a training environment. The training environment can be a part of the incremental training system and can be either separate from the inference system or a subsystem of the inference system, or a combination thereof. In some implementations, the training environment is a compute environment with large amounts of resources in order to rapidly process and adjust the parameters of the adapter and the generative AI model.

At 218, the loaded adapters are trained based on the untrained interaction history. In some implementations, parameter weights of the adapters are adjusted while the underlying generative AI model is fixed. In this manner, PEFT, LoRA training, or other techniques can be performed rapidly for each new adapter to be trained.

Upon completion of training at 220, the interaction history can be updated and the untrained history can be moved into a repository of trained interaction history. Then, in some implementations, another check can be performed to confirm that the untrained history is now below the predetermined threshold size (214).

In some implementations, the trained and untrained history, as well as the adapters that have been trained or partially trained are stored using asymmetric encryption with deterministic key generation. Deterministic key generation allows key recovery via passphrase, and enables user ownership and control over their data. During inferencing, a user will provide their key as consent to access/use their adapters. In some implementations, the inferencing system can store keys received temporarily in volatile memory, which is cleared after inference or processing is complete.

At 222, the newly trained adapters are sent to a live environment for use. In some implementations, the newly trained adapters are uploaded to an adapter database, and the inference system can download them at a suitable time. For example, during a period of low traffic or when the user associated with the newly trained adapter is logged off, the inference system can update its generative AI model with at least one newly trained adapter (224). In some implementations, the latest or most current adapter is loaded from a storage when a user (or entity) initiates an inference session. This can ensure that inferences are always conducted with the latest adapter.

Figure 3:
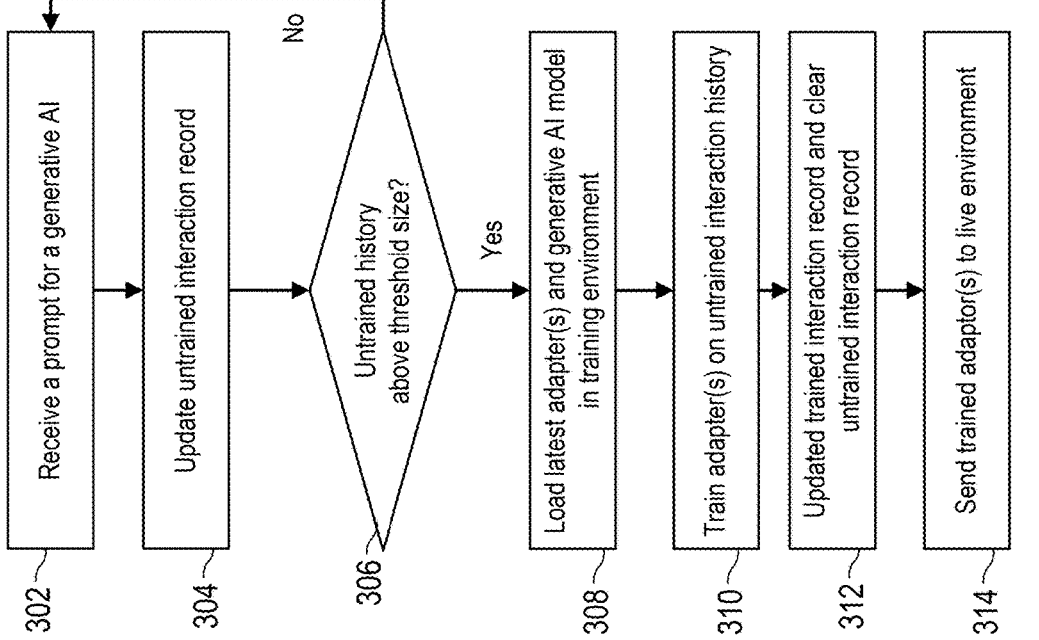
FIG. 3 is a flowchart illustrating an example process for incrementally customizing a generative AI model.

FIG. 3 is a flowchart illustrating an process for incrementally customizing a generative AI model. The example process 300 can be performed by a system for example, system 100 as described above with respect to FIG. 1. The operations shown in process 300 may not be exhaustive and other operations can be performed as well before, after, or in between any of the illustrated operations. Further, some of the operations may be performed simultaneously, or in a different order than shown in FIG. 3. In some implementations, some of the operations may be performed by a computer, or multiple computers. The one or more computers the process 300 will be described as being performed by a system of, located in one or more locations, and programmed appropriately in accordance with this specification. For example, one or more of a computation system 400 of FIG. 4, appropriately programmed, can perform the process 300.

At 302, a prompt is received for a generative AI model executing with one or more associated adapters. The prompt can be a text, audio, image(s), video, other form of input, or a combination thereof, and can be delivered by a user device.

At 304, an untrained interaction history can be updated. The untrained interaction history can include a number of interactions including user prompts and machine responses. These interactions can be ones that have not yet been used in the incremental training process.

At 306, it is determined whether the untrained history is greater than a threshold size. This can be, for example, greater than a predetermined number of tokens (e.g., 4000, 8000, etc.) or for audio or video prompts, longer than a certain length. In some implementations, the threshold size is based on the maximum input size to the generative AI model. If the threshold size is not met, no further action need be taken and process 400 can wait until a new prompt is received.

At 308, if the threshold size is exceeded, a training event can be triggered and the latest adapters and the generative AI model are loaded into a training environment. The training environment can be a part of the incremental training system and can be separate from the inference system, or a subsystem of the inference system. In some implementations, the training environment is a compute environment with large amounts of resources in order to rapidly process and adjust the parameters of the adapter and the generative AI model.

At 310, the loaded adapters are trained based on the untrained interaction history. In some implementations, parameter weights of the adapters are adjusted while the underlying generative AI model is fixed. In this manner, PEFT or LoRA, or other techniques can be performed rapidly for each new adapter to be trained.

At 312, the interaction history can be updated and the untrained history can be moved into a repository of trained interaction history. In some implementations, the trained interaction history can be stored in perpetuity.

At 314, the newly trained adapters are sent to a live environment for use. In some implementations, the newly trained adapters are uploaded to an adapter database, and the inference system can download them at a suitable time. For example, during a period of low traffic or when the user associated with the newly trained adapter is logged off, the inference system can update its generative AI model with the at least one newly trained adapter. In some implementations, the latest or most current adapter is loaded from a storage when a user (or entity) initiates an inference session. This can ensure that inferences are always conducted with the latest adapter.

Figure 4:
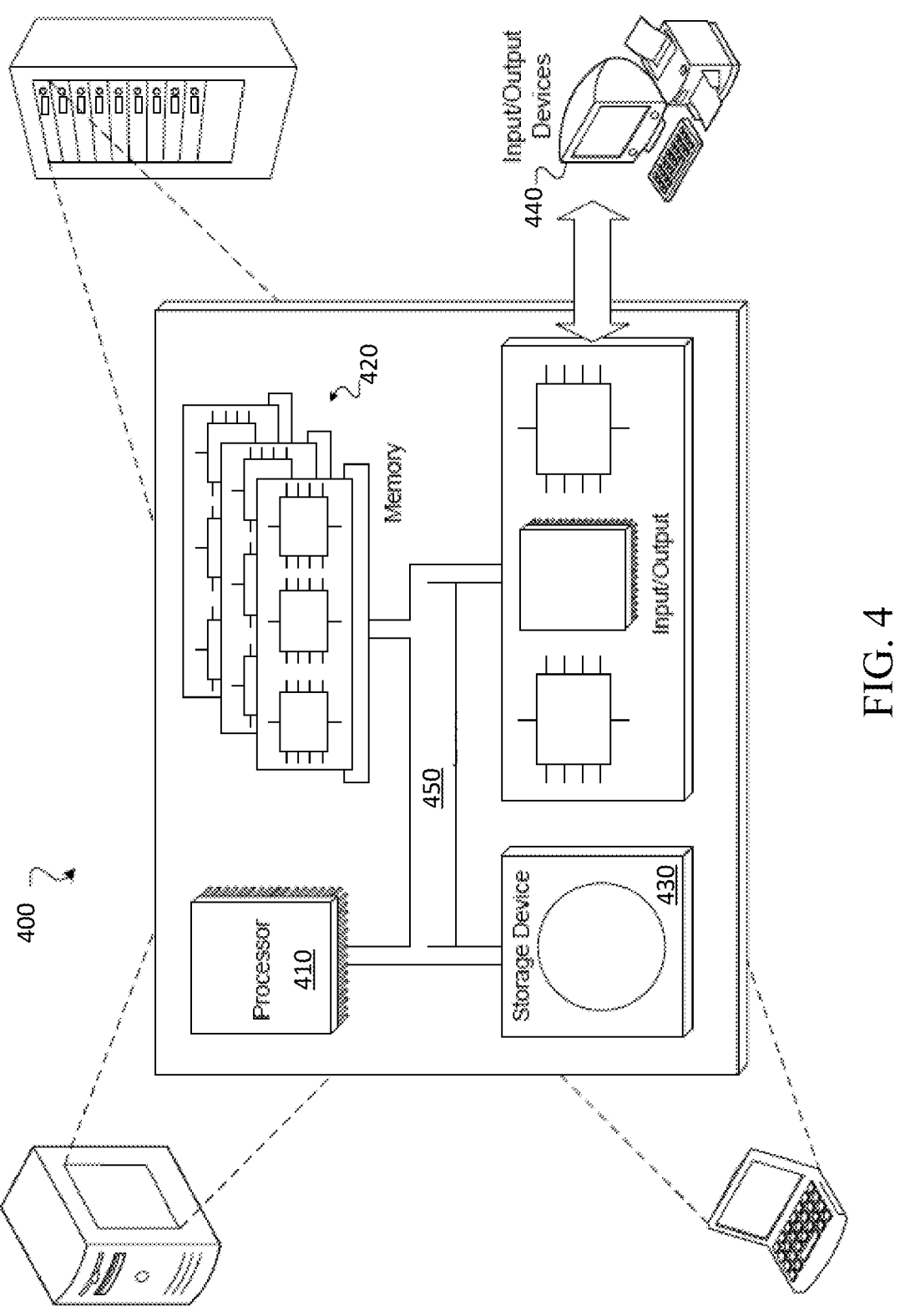
FIG. 4 illustrates a schematic diagram of an example computing system.

FIG. 4 illustrates a schematic diagram of an example computing system 400. The system 400 can be used for the operations described in association with the implementations described herein. For example, the system 400 may be included in computing devices of the one or more online components and/or the one or more offline components. The system 400 includes a processor 410, a memory 420, a storage device 430, and an input/output device 440, which are interconnected using a system bus 450. The processor 410 is capable of processing instructions for execution within the system 400. In some implementations, the processor 410 is a single-threaded processor. The processor 410 is a multi-threaded processor. The processor 410 is capable of processing instructions stored in the memory 420 or on the storage device 430 to display graphical information for a user interface on the input/output device 440.

The memory 420 stores information within the system 400. In some implementations, the memory 420 is a computer-readable medium. The memory 420 can be a volatile memory unit or a non-volatile memory unit. The storage device 430 is capable of providing mass storage for the system 400. The storage device 430 is a computer-readable medium. The storage device 430 may be a floppy disk device, a hard disk device, an optical disk device, or a tape device. The input/output device 440 provides input/output operations for the system 400. The input/output device 440 includes a keyboard and/or pointing device. The input/output device 440 includes a display unit for displaying graphical user interfaces.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random-access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship with each other. In some implementations, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

As used in this disclosure, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

As used in this disclosure, the term "about" or "approximately" can allow for a degree of variability in a value or range, for example, within 10%, within 5%, or within 1% of a stated value or of a stated limit of a range.

As used in this disclosure, the term "substantially" refers to a majority of, or mostly, as in at least about 50%, 60%, 70%, 80%, 90%, 95%, 96%, 97%, 98%, 99%, 99.5%, 99.9%, 99.99%, or at least about 99.999% or more.

Values expressed in a range format should be interpreted in a flexible manner to include not only the numerical values explicitly recited as the limits of the range, but also the individual numerical values or sub-ranges encompassed within that range as if each numerical value and sub-range is explicitly recited. For example, a range of "0.1% to about 5%" or "0.1% to 5%" should be interpreted to include about 0.1% to about 5%, as well as the individual values (for example, 1%, 2%, 3%, and 4%) and the sub-ranges (for example, 0.1% to 0.5%, 1.1% to 2.2%, 3.3% to 4.4%) within the indicated range. The statement "X to Y" has the same meaning as "about X to about Y," unless indicated otherwise. Likewise, the statement "X, Y, or Z" has the same meaning as "about X, about Y, or about Z," unless indicated otherwise.

Particular implementations of the subject matter have been described. Other implementations, alterations, and permutations of the described implementations are within the scope of the following claims as will be apparent to those skilled in the art. While operations are depicted in the drawings or claims in a particular order, such operations are not required to be performed in the particular order shown or in sequential order, or that all illustrated operations be performed (some operations may be considered optional), to achieve desirable results. In certain circumstances, multi-tasking or parallel processing (or a combination of multi-tasking and parallel processing) may be advantageous and performed as deemed appropriate.

Moreover, the separation or integration of various system modules and components in the previously described implementations are not required in all implementations, and the described components and systems can generally be integrated together or packaged into multiple products.

Accordingly, the previously described example implementations do not define or constrain the present disclosure. Other changes, substitutions, and alterations are also possible without departing from the spirit and scope of the present disclosure.

The foregoing description of the specific implementations can be readily modified and/or adapted for various applications. Therefore, such adaptations and modifications are intended to be within the meaning and range of equivalents of the disclosed implementations, based on the teaching and guidance presented herein.

The breadth and scope of the present disclosure should not be limited by any of the above-described example implementations but should be defined only in accordance with the following claims and their equivalents. Accordingly, other implementations also are within the scope of the claims.

The invention claimed is:

1. A computer implemented method comprising:
receiving, from an entity, a prompt for a generative AI model, wherein the generative AI model is loaded in an inference environment with one or more adapters, and wherein the one or more adapters comprise a feed forward network layer inserted between layers of the generative AI model;
updating a first interaction record with the prompt, the first interaction record comprising a series of prompts and responses between the entity and the generative AI model;
in response to determining that the updated first interaction record comprises less than a predetermined number of tokens:
sending the prompt and the updated first interaction record to the generative AI model;
receiving a response from the generative AI model; and
adding the response to the first interaction record; and
in response to determining that the updated first interaction record comprises greater than or equal to the predetermined number of tokens, incrementally training the generative AI model, wherein incrementally training the generative AI model comprises:
loading the generative AI model into a training environment;
loading the one or more adapters in the training environment;
training the one or more adapters in the training environment with the generative AI model based on the updated first interaction record to produce one or more updated adapters, wherein training the one or more adapters in the training environment comprises: performing parameter efficient fine tuning (PEFT) on the generative AI model with the one or more adapters, wherein the PEFT comprises maintaining model weights associated with the generative AI model static while modifying model weights associated with the one or more adapters in the training environment;
clearing at least a portion of the first interaction record; and
loading the one or more updated adapters with the generative AI model in the inference environment.

2. The method of claim 1, wherein the prompt is tokenized after being received from the entity and after the first interaction record is updated.

3. The method of claim 2, wherein determining that the updated first interaction record comprises greater than a predetermined number of tokens is based on a maximum number of input tokens the generative AI model can accept.

4. The method of claim 1, wherein the updated one or more adapters are stored as an encrypted package in an adapter repository.

5. The method of claim 1, wherein the one or more adapters comprise a feedforward neural network with a bottleneck architecture.

6. The method of claim 1, comprising, in response to determining that the updated first interaction record comprises greater than a predetermined number of tokens:

updating a second interaction record with interactions in the first interaction record, wherein the second interaction record comprises interaction history between the entity and the generative AI model that has been previously used to train the one or more adapters.

7. The method of claim 1, wherein the entity is a human user.

8. The method of claim 1, wherein the generative AI model is a first generative AI model, and the entity is a second generative AI model.

9. A non-transitory, computer-readable medium storing one or more instructions executable by a computer system to perform operations comprising:
receiving, from an entity, a prompt for a generative AI model, wherein the generative AI model is loaded in an inference environment with one or more adapters, and wherein the one or more adapters comprise a feed forward network layer inserted between layers of the generative AI model;
updating a first interaction record with the prompt, the first interaction record comprising a series of prompts and responses between the entity and the generative AI model;
in response to determining that the updated first interaction record comprises less than a predetermined number of tokens:
sending the prompt and the updated first interaction record to the generative AI model;
receiving a response from the generative AI model; and
adding the response to the first interaction record; and
in response to determining that the updated first interaction record comprises greater than or equal to the predetermined number of tokens, incrementally training the generative AI model, wherein incrementally training the generative AI model comprises:
loading the generative AI model into a training environment;
loading the one or more adapters in the training environment;
training the one or more adapters in the training environment with the generative AI model based on the updated first interaction record to produce one or more updated adapters, wherein training the one or more adapters in the training environment comprises: performing parameter efficient fine tuning (PEFT) on the generative AI model with the one or more adapters, wherein the PEFT comprises maintaining model weights associated with the generative AI model static while modifying model weights associated with the one or more adapters in the training environment;
clearing at least a portion of the first interaction record; and
loading the one or more updated adapters with the generative AI model in the inference environment.

10. The medium of claim 9, wherein the prompt is tokenized after being received from the entity and after the first interaction record is updated.

11. The medium of claim 10, wherein determining that the updated first interaction record comprises greater than a predetermined number of tokens is based on a maximum number of input tokens the generative AI model can accept.

12. The medium of claim 9, wherein the updated one or more adapters are stored as an encrypted package in an adapter repository.

13. The medium of claim 9, wherein the one or more adapters comprise a feedforward neural network with a bottleneck architecture.

14. The medium of claim 9, comprising, in response to determining that the updated first interaction record comprises greater than a predetermined number of tokens:

updating a second interaction record with interactions in the first interaction record, wherein the second interaction record comprises interaction history between the entity and the generative AI model that has been previously used to train the one or more adapters.

15. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations comprising:

receiving, from an entity, a prompt for a generative AI model, wherein the generative AI model is loaded in an inference environment with one or more adapters, and wherein the one or more adapters comprise a feed forward network layer inserted between layers of the generative AI model;

updating a first interaction record with the prompt, the first interaction record comprising a series of prompts and responses between the entity and the generative AI model;

in response to determining that the updated first interaction record comprises less than a predetermined number of tokens:

sending the prompt and the updated first interaction record to the generative AI model;

receiving a response from the generative AI model; and adding the response to the first interaction record; and in response to determining that the updated first interaction record comprises greater than or equal to the predetermined number of tokens, incrementally training the generative AI model, wherein incrementally training the generative AI model comprises:

loading the generative AI model into a training environment;

loading the one or more adapters in the training environment;

training the one or more adapters in the training environment with the generative AI model based on the updated first interaction record to produce one or more updated adapters, wherein training the one or more adapters in the training environment comprises: performing parameter efficient fine tuning (PEFT) on the generative AI model with the one or more adapters, wherein the PEFT comprises maintaining model weights associated with the generative AI model static while modifying model weights associated with the one or more adapters in the training environment;

clearing at least a portion of the first interaction record; and loading the one or more updated adapters with the generative AI model in the inference environment.

16. The system of claim 15, wherein the prompt is tokenized after being received from the entity and after the first interaction record is updated.

17. The system of claim 16, wherein determining that the updated first interaction record comprises greater than a predetermined number of tokens is based on a maximum number of input tokens the generative AI model can accept.

18. The system of claim 15, wherein the updated one or more adapters are stored as an encrypted package in an adapter repository.

* * * * *